United States Patent [19]

Ishiwata et al.

[11] Patent Number: 5,291,467
[45] Date of Patent: Mar. 1, 1994

[54] DISC RECORDING APPARATUS FOR RECORDING A SIGNAL WITHOUT LOSING THE SIGNAL DURING AN OCCURRENCE OF A TRACK JUMP

[75] Inventors: Koji Ishiwata; Masaru Tezuka; Teruhito Noshiro; Satoru Tobita, all of Kanagawa, Japan

[73] Assignee: Sony Corporation, Tokyo, Japan

[21] Appl. No.: 912,528

[22] Filed: Jul. 13, 1992

[30] Foreign Application Priority Data

Jul. 16, 1991 [JP] Japan .................................. 3-201357

[51] Int. Cl.⁵ .............................................. G11B 7/00
[52] U.S. Cl. .............................. 369/44.28; 369/44.34; 369/54; 369/32
[58] Field of Search ................ 369/54, 53, 58, 44.28, 369/44.32, 44.29, 44.34, 44.35, 47, 48, 32; 360/78.04, 78.11

[56] References Cited

U.S. PATENT DOCUMENTS

| | | | |
|---|---|---|---|
| 4,796,247 | 1/1989 | Vogelsang | 360/78.11 |
| 4,956,832 | 9/1990 | Miyasaka | 369/54 |
| 5,132,956 | 7/1992 | Ichikawa | 369/54 |

FOREIGN PATENT DOCUMENTS 0164642 12/1985 European Pat. Off. .
0219261 4/1987 European Pat. Off. .
0249781 12/1987 European Pat. Off. .

OTHER PUBLICATIONS

Patent Abstracts of Japan, vol. 10, No. 338 (P-516) Nov. 15, 1986 & JP-A-61 139 984 (Nippon Columbia) Jun. 27, 1986.

*Primary Examiner*—Aristotelis Psitos
*Assistant Examiner*—Muhammad N. Edun
*Attorney, Agent, or Firm*—William S. Frommer; Alvin Sinderbrand

[57] ABSTRACT

An apparatus for recording a signal on a disc medium driven by a servo circuit comprises, device for generating a laser beam for recording the signal on the disc medium, device for detecting a track jump of a scan of the disc medium by the laser beam, device for storing the signal during an occurrence of the track jump, and controller for controlling the laser beam generating device, track jump detecting device and storing device so that a recording operation by the laser beam is stopped during the occurrence of the track, and the signal stored in the storing device is recorded on a predetermined area of the disc medium after the record operation becomes to be possible.

6 Claims, 8 Drawing Sheets

| NO. | TRACKING ERROR SIGNAL ABNORMAL | SUM SIGNAL | ACCELE-RATION SENSOR | ADR CONTINUITY | DETERMINATION AND PROCESS |
|---|---|---|---|---|---|
| 1 | o | o | o | o | NORMAL, CONTINUE |
| 2 | o | o | 1 | o | CONTINUE |
| 3 | o | 1 | o | o | TEMPORARY STOP → RETRY (→SUBSTITUTE) |
| 4 | o | 1 | 1 | o | TEMPORARY STOP → RETRY |
| 5 | 1 | o | o | o | TEMPORARY STOP → RETRY (→SUBSTITUTE) |
| 6 | 1 | o | 1 | o | TEMPORARY STOP → RETRY |
| 7 | 1 | 1 | o | o | TEMPORARY STOP (→RETRY)→SUBSTITUTE |
| 8 | 1 | 1 | 1 | o | TEMPORARY STOP → RETRY |
| 9 | x | x | x | 1 | TEMPORARY STOP → RETRY (→SUBSTITUTE) | o: NORMAL   1: ABNORMAL x: "o" OR "1"

DISC RECORDING APPARATUS FOR RECORDING A SIGNAL WITHOUT LOSING THE SIGNAL DURING AN OCCURRENCE OF A TRACK JUMP

BACKGROUND OF THE INVENTION

1. Field of the Invention

The present invention relates to a disc recording apparatus, in particular, relates to a disc recording apparatus for recording data on a recording medium such as an optical disc and a photomagnetic disk.

2. Description of the Prior Art

Recording apparatuses for recording data on recording media such as optical disks and photomagnetic disks record and reproduce signals to and from recording media in such a way that the heads for use do not mechanically contact with the surfaces of the recording media. Thus, this construction contributes to elongating the service lives of the pickups and to improving the reliability thereof. However, the pickups sometimes cause a track jump due to vibration, shock, and so forth applied from the outside of the apparatuses. If a track jump takes place in the record mode, data which has been recorded may be destroyed or erased. Conventionally, to prevent data which has been recorded from being destroyed and erased, when a track jump takes place in the record mode, the record operation is temporarily stopped and then the data is recorded from the beginning.

In addition, when data which has been recorded cannot be reproduced with high reliability (error free state) due to a defect on the disc surface, the data to be recorded is recorded to a so-called substitute area. This process is hereinafter called the substitute process.

When the record operation is temporarily stopped due to occurrence of a track jump or by the substitute process and then the data is recorded from the beginning, it is preferable to stop inputting the data. However, depending on the type of data, it may be very difficult or impossible to stop inputting the data. In this situation, while the record operation is stopped, the input data is not recorded, but lost. For example, since digital audio data (hereinafter referred to as audio data) is continuously input in a particular sampling period, the data cannot be stopped in the middle of the input thereof. Thus, when the record operation is temporarily stopped, audio data in this period is lost. Although the conventional disc recording apparatuses are provided with memory, this memory is used mainly for processing signals rather than for storing the audio data. This is because the memory for storing the audio data should have a large amount of storage capacity.

Even if the record operation is temporarily stopped or the substitute process is performed, so as to securely store the audio data, a disc recording apparatus which performs record operation, reproduce operation, and seek operation substantially at a very high speed than the data transfer rate may be considered. However, this apparatus is difficult to accomplish from technical and cost points of view.

The applicant of the present invention has proposed an optical disc reproducing apparatus which can obtain continuous reproducing output upon occurrence of a track jump. This apparatus has been disclosed as Japanese Patent Laid-open Publication Serial No. HEI 3-3165. According to this prior art, even if an optical spot jumps to an incorrect track, digital data which has been stored in a memory means can be read in accordance with a first master clock and thereby the reproducing output can be obtained without suspension thereof. In addition, after the optical spot is returned back to the correct track, the optical disc is rotated at a second speed which is higher than the first speed in accordance with a second master clock with a frequency higher than that of the first master clock. In this state, the digital data is read from the optical disc and written to the memory means in accordance with the second master clock. Thus, the amount of digital data which is read from the memory means during the restoration from the track jump is quickly stored to the memory means.

According to the above mentioned related art, although no problem takes place in reproducing data from the optical disk, there are problems in recording data to the optical disk.

When a track jump takes place, the record operation is temporarily stopped and then resumed. However, measures for preventing audio data which has been recorded from being destroyed and lost are required. In addition, measures for securely recording data without loss in the event that the reliability of data stored for a long time is low or in the event that the surface of the optical disc has a defect should be taken.

OBJECTS AND SUMMARY OF THE INVENTION

Therefore, an object of the present invention is to provide a disc recording apparatus for securely recording data in the event that a track jump takes place or in the event that a defect is present on the surface of the optical disk.

According to an aspect of the invention, there is provided an apparatus for recording a signal on a disc medium driven by a servo circuit, comprising, means for generating a laser beam for recording the signal on the disc medium, means for detecting a track jump of a scan of the disc medium by the laser beam, means for storing the signal during an occurrence of the track jump, and means for controlling the laser beam generating means, track jump detecting means and storing means so that a recording operation by the laser beam is stopped during the occurrence of the track jump, and the signal stored in the storing means is recorded on a predetermined area of the disc medium after the record operation becomes to be possible.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Then, with reference to FIGS. 1 to 8, an embodiment in accordance with the present invention will be described. In this embodiment, an optical disc recording apparatus will be described as an example of the disc recording apparatus.

Figure 1:
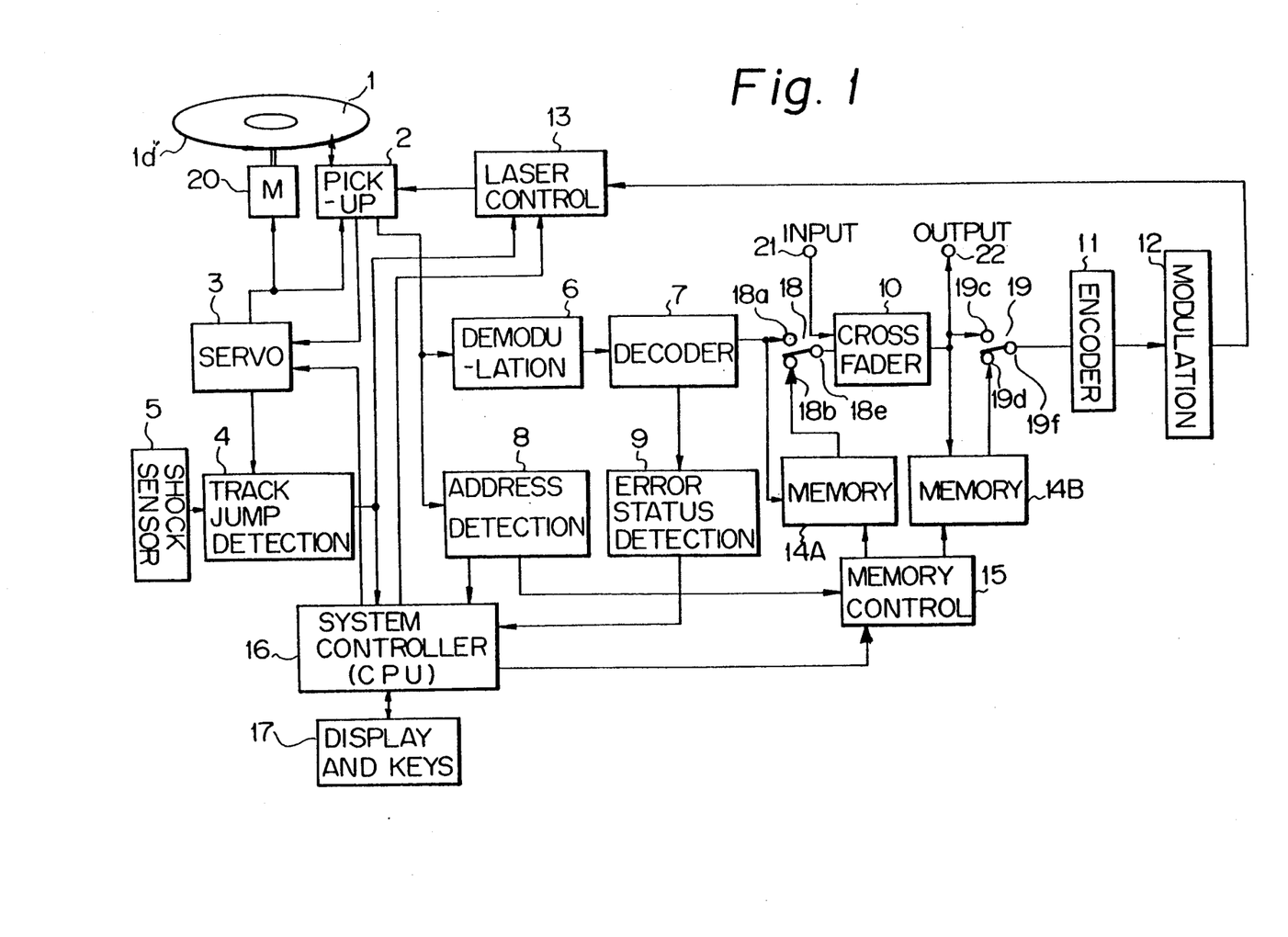
FIG. 1 is a block diagram showing a construction of an embodiment according to the present invention.

FIG. 1 is a block diagram showing a construction of a system in accordance with the present invention. First, a record system will be described. In the construction shown in FIG. 1, audio data received through a terminal 21 or audio data received from a memory 14a through a switch 18 is sent to a terminal 22, a terminal 19c of a switch 19, a memory 14b, and so forth through a cross fader 10 for editing data which has been recorded. The audio data sent to the memory 14b is recorded to the memory 14b under the control of a memory controller 15, which will be described later. Thus, the audio data is temporarily stored in the memory 14b in the record operation mode. The audio data which is received from the cross fader 10 or the memory 14b is selected by the switch 19 and then the selected audio data is sent to an encoder 11.

The encoder 11 performs interleaving, addition of error correction code, and so forth for the audio data. Thus, record data is formed. The record data is sent to a modulation circuit 12. The modulation circuit 12 modulates the record data in a predetermined modulation method and outputs a modulation signal. The modulation signal is sent to a laser control circuit 13.

The laser control circuit 13 controls the driving of a laser diode provided in a pickup 2 and the level of laser light generated by the laser diode in accordance with control signals received from a track jump detection circuit 4 and/or a system controller 16. The laser control circuit 13 generates a modulation drive signal for driving the laser diode in accordance with the modulation signal received from the modulation circuit 12 in the record operation state. In addition, the laser control circuit 13 generates a drive signal for outputting laser light in the level necessary for the reproduce operation. The modulation drive signal and the laser light drive signal are sent to the pickup 2.

In the pickup 2, the laser diode (not shown in the figure) is driven and controlled in accordance with the modulation drive signal in the record operation mode or in accordance with the drive signal in the reproduce operation mode. The laser light outputted by the laser diode is irradiated to a disc surface 1a of an optical disc 1 through an optical system provided in the pickup 2. Thus, when the laser light is in a record level, the data is recorded on the disc surface 1a. A servo circuit 3, which will be described later, performs servo control operations such as a tracking control operation, a focus control operation, and a threadier control operation for the pickup 2.

In the record operation state, the laser light irradiated from the pickup 2 to the disc surface 1a of the optical disc 1 is reflected to the pickup 2. The reflected light is converted into a modulation signal by the photo diode provided in the pickup 2. The modulation signal is sent to a demodulation circuit 6, an address detection circuit 8, and a servo circuit 3. The address detection circuit 8 detects address data which has been recorded on the disc surface 1a of the optical disc 1. The address data is sent to the system controller 16 and a memory controller 15.

Next, a reproduce system of the apparatus will be described. The laser light irradiated from the pickup 2 to the disc surface 1a of the optical disc 1 is reflected to the pickup 2. The reflected light is converted into a modulation signal by the photo diode provided in the pickup 2. The modulation signal is sent to the demodulation circuit 6, the address detection circuit 8, and the servo circuit 3.

Although the detail of the pickup 2 is not shown in the figure, it can reproduce data while recording the data. With one objective lens, both the record and reproduce operations can be performed. Alternatively, respective optical systems for the record system and the reproduce system can be provided. The demodulation circuit 6 demodulates the reproduced modulation signal to reproduce the recorded data. This record data is sent to a decoder 7. The address detection circuit 8 detects address data which has been recorded on the disc surface 1a of the optical disc 1. This address data is sent to the system controller 16 and the memory controller 15. The decoder 7 performs error detection, error correction, deinterleaving, and so forth in accordance with an error correction code associated with audio data. The resultant audio data is sent to a terminal 18a of the switch 18 and the memory 14a. The error detection result of the decoder 7 is sent to the error status detection circuit 9. The audio data sent to the memory 14a is stored in the memory 14a under the control of the memory controller 15 or the system controller 16, which will be described later. The audio data is temporarily stored in the memory 14a for the substitute process in the reproduce operation mode. The error status detection circuit 9 keeps track of the result of the error detection performed by the decoder 7. When the result of the error detection becomes worse than a predetermined level, a substitute process request signal is sent to the system controller 16.

The servo circuit 3 performs the servo control operations for the pickup 2 and a motor 20. In other words, the servo circuit 3 performs the focus control operation, the tracking control operation, the threader control operation, and so forth for the pickup 2. In addition, the servo circuit 3 performs the CLV control operation of the optical disc 1 for the motor 20. The pickup 2 sends servo control signals such as a tracking error signal STR and a sum signal to the servo circuit 3 to perform the predetermined servo control. In addition, the system controller 16 sends control signals to the servo circuit 3. The servo circuit 3 performs the servo control operations for the pickup 2 and the motor 20 in accordance with the control signals from the system controller 16 and in accordance with the tracking error signal STR, the sum signal, and so forth from the pickup 2. The tracking error signal, the sum signal, and so forth are sent to the track jump detection circuit 4 through the servo circuit 3.

A shock sensor 5 is constructed of an acceleration sensor. When the shock sensor 5 detects vibration or shock applied from the outside of the apparatus, it sends a shock detection signal which is for example in high level to the track jump detection circuit 4. The track jump detection circuit 4 determines whether a track jump took place in accordance with the tracking error signal STR, the sum signal, and the shock detection signal which is received from the shock sensor 5. When the track jump detection circuit 4 detects a track jump, it sends a track jump detection signal which is for example in high level to the laser control circuit 13 and the system controller 16. On the other hand, when the track jump detection circuit 4 detects the abatement of the effect of vibration or shock, it sends a shock abatement signal which is for example in high level to the laser control circuit 13 and the system controller 16.

The system controller 16 controls the entire system shown in FIG. 1. The system controller 16 is supplied with signals from the track jump detection circuit 4, the address detection circuit 8, the error status detection circuit 9, and so forth. The system controller 16 sends various signals including control signals to the servo circuit 3, the laser control circuit 13, and the memory controller 15. The system controller 16 sends control signals (not shown in the figure) to the switches 18 and 19. These control signals control the connection states of the switches 18 and 19. The system controller 16 is connected to a display and key operation portion 17. The display and key operation portion 17 is provided with various keys for user's operations. Signals corresponding to the keys are sent to the system controller 16. The system controller 16 sends signals corresponding to characters, figures, symbols, and so forth representing various statuses as well as system modes to the display and key operation portion 17. Thus, the display and key operation portion 17 can display system statuses to the user.

The memory controller 15 sends write addresses and/or read addresses to the memories 14a and 14b in accordance with the control signals from the system controller 16 and in accordance with the address data from the address detection circuit 8. Thus, the write operation of the audio data to the memories 14a and 14b and the read operation of the memories 14a and 14b are controlled.

Next, with reference to FIGS. 1 and 2, the operations of the retry process and the substitute process will be described. Before the operations of the retry process and the substitute process are described, the retry process and the substitute process will be outlined.

First, the retry process will be outlined. The retry process can prevent important data which has been recorded from being destroyed and lost in the event that a track jump took place or it almost took place due to external shock or vibration applied from the outside of the apparatus.

Next, the substitute process will be outlined. The substitute process can record data in a predetermined substitute area in the event that the quality of the data being recorded is bad and the reliability of the long time storage is low or in the event that it is determined that there is a defect on the disc surface 1a of the optical disc 1. Thus, the substitute process is performed to assure the quality of data to be reproduced.

Figure 2:
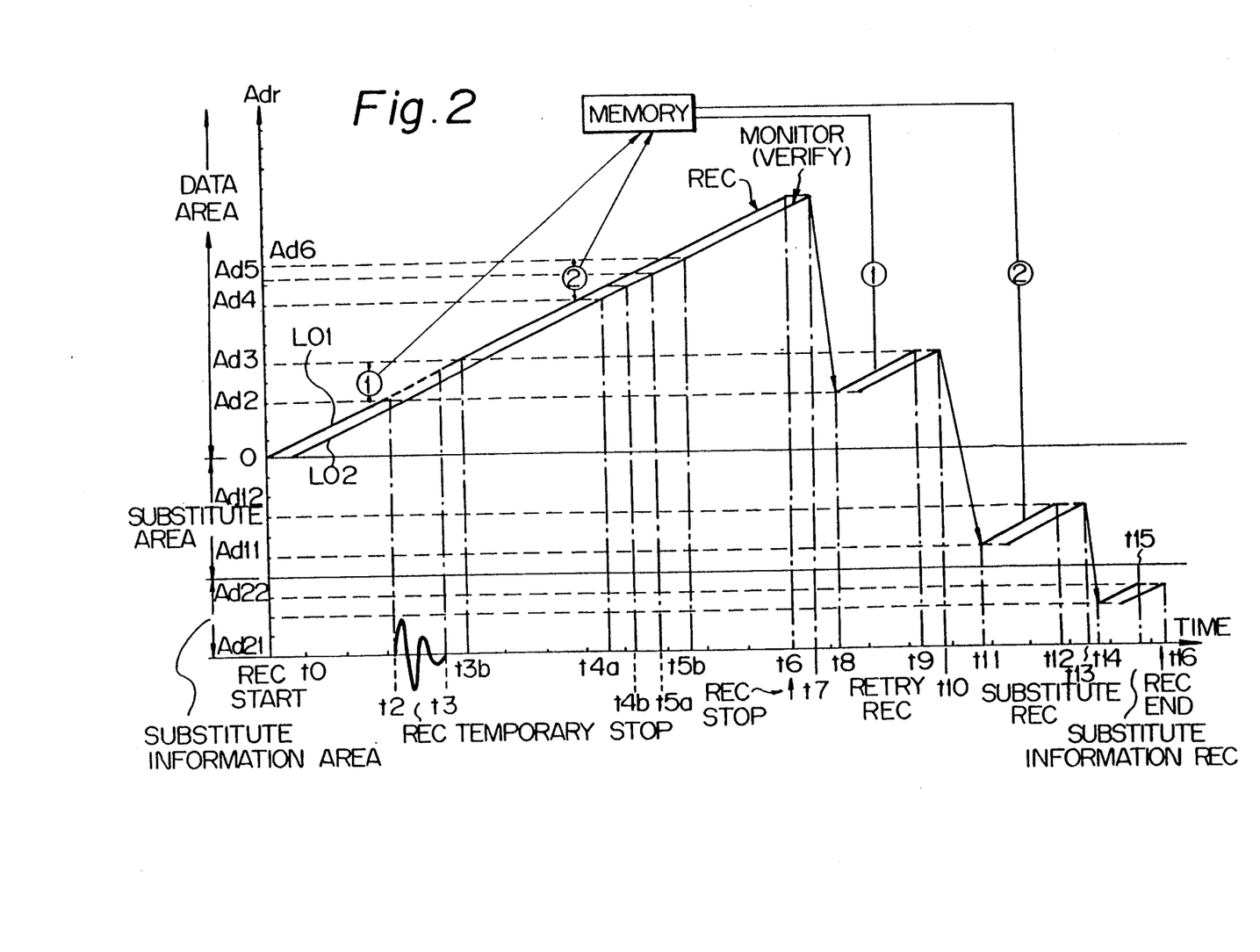
FIG. 2 is a chart describing a substitute process and a retry process.

With reference to FIGS. 1 and 2, the record operation (record mode) and the substitute process and the retry process in the record operation mode will be described. In FIG. 2, the vertical axis represents an address of the disc surface 1a, whereas the horizontal axis represents a time. On the vertical axis, there are substitute information area, substitute area, and data area disposed outwardly from the center of the disc surface 1a.

First, the retry process will be described. In the example shown in FIG. 2, line LO1 represents the retry process. In the initial state of the record mode, the terminals 18a and 18e of the switch 18 are connected, whereas the terminals 19c and 19f of the switch 19 are connected. When the user performs a key operation for entering the apparatus into the record mode, signals corresponding to the key operation are sent from the display and key operation portion 17 to the system controller 16.

When the system controller 16 receives this signal, it enters the record mode. The system controller 16 sends a control signal necessary for performing the record operation to the laser control circuit 13. The laser control circuit 3 sends a control signal to the pickup 2. Thus, the output of the laser light is set to a record level.

The audio data received from the terminal 21 is sent to the cross fader 10, the switch 19, and the encoder 11 in this order. Thus, record data is obtained. The record data is converted into a modulation signal by the modulation circuit 12 and then sent to the laser control circuit 13. In the record mode, the audio data is sent from the cross fader 10 to the memory 14b. The audio data is successively written to the memory 14b in accordance with write addresses designated by the memory controller 15.

The laser control circuit 13 generates a modulation drive signal for driving the laser diode (not shown in the figure) in accordance with the modulation signal being received. This modulation drive signal is sent to the pickup 2. The laser diode provided in the pickup 2 is driven and controlled in accordance with the modulation drive signal. The laser light generated by the laser diode is irradiated to the disc surface 1a of the laser light. Thus, data can be recorded on the disc surface 1a of the optical disc 1.

In FIG. 2, at time t0, the record mode takes place and the record operation is started. At time t0, data is recorded from the start address of the data area. The address of the data being recorded linearly increases as shown by line LO1. In the record operation state, the laser light reflected from the disc surface 1a is detected by the pickup 2 and converted into a modulation signal. The modulation signal is sent to the address detection circuit 8.

The address detection circuit 8 obtains address data in accordance with the modulation signal and sends the address data to the system controller 16. The system controller 16 keeps track of the address data. In other words, with reference to the address data, the system controller 18 performs various servo control operations for the pickup 2 through the servo circuit 3. Thus, the position of the pickup 2 is correctly placed.

At time t2, when shock or vibration is applied from the outside of the apparatus, the shock sensor 5 generates a shock detection signal which is for example in high level. This shock detection signal is sent to the track jump detection circuit 4. The tracking error signal STR and the sum signal generated in accordance with the reflected light from the disc surface 1a are sent to the track jump detection circuit 4 through the servo circuit 3. In addition, the reproduced address data is sent from the address detection circuit 8 to the system controller 16 and the memory controller 15.

The track jump detection circuit 4 determines whether a track jump took place in accordance with the shock detection signal, the tracking error signal STR, the sum signal, and so forth. When the track jump detection circuit 4 determines that a track jump took place, the track jump detection signal along with the shock detection signal, the tracking error signal STR, the sum signal, and so forth is sent to the laser control circuit 13 and the system controller 16.

The system controller 16 determines the subsequent operation in accordance with the shock detection signal, the tracking error signal STR, the sum signal, and the continuity of the address data. Practically, the system controller 16 determines what of the following cases is applied. Control signals are sent from the system controller 16 to the laser control circuit 13 so as to control the level of the laser light generated by the laser diode to the reproduce level.

The laser control circuit 13 controls the output level of the laser diode of the pickup 2 to decrease to the reproduce level in accordance with the track jump detection signal and/or the control signal from the system controller 16. Thus, at time t2, the record operation is temporarily stopped. Thus, even if a track jump took place, this construction can prevent data from being incorrectly recorded to other than a predetermined position and data which has been recorded from being destroyed.

At time t2, the system controller 16 detects occurrence of a track jump in accordance with the shock detection signal, the tracking error signal STR, the sum signal (track jump detection signal), other signals, and/or the continuity of address data. At that time, the system controller 16 stores address Ad2 at time t2 in accordance with the address data received from the address detection circuit 8. In addition, the system controller 16 controls the memory 14b through the memory controller 15. In other words, while the record operation is temporarily stopped after time t2, the system controller 16 stores the audio data to the memory 14b.

At time t3 when the track jump detection circuit 4 detects the abatement of shock, vibration, or the like applied from the outside of the apparatus in accordance with the shock detection signal, the tracking error signal STR, the sum signal, and so forth, the circuit 4 generates a shock abatement signal which is for example in high level and sends this signal to the system controller 16. When the system controller 16 receives the shock abatement signal, it controls the position of the pickup 2 through the servo circuit 3 so that the continuity of the address data around which the track jump took place is kept. For example, the servo circuit 3 controls the pickup 2 to move to the position of address Ad2 where the pickup 2 was positioned just before the track jump took place. Thereafter, the servo circuit 3 moves the pickup 2 for the distance from address Ad2 to address Ad3 corresponding to time t2 to time t3 so that the continuity of the address data is kept.

In the period from time t2 to time t3, the record operation is not performed. At time t3a, the system controller 16 controls the laser control circuit 13 to raise the output level of the laser diode to the record level. Thus, at time t3a, the normal record operation is resumed in the state where the address continuity is kept. The record operation is continued and at time t6 the record operation is completed by the user's key operation or by a program which has been stored. When the system controller 16 detects the completion of the record operation at time t6, it sends a particular control signal to the laser control circuit 13 and the switch 19. The laser control circuit 13 lowers the output level of the laser diode 22 to the reproduce level in accordance with the control signal received from the system controller 16. In addition, the terminals 19d and 19f of the switch 19 are connected in accordance with the control signal received from the system controller 16.

In the period from time t6 to time t7, the system controller 16 controls the servo circuit 3 to move the pickup 2 to address Ad2 where the pickup 2 was positioned just before the track jump took place. From time t7, the servo circuit 3 initiates to move the pickup 2 to address Ad2 where the pickup 2 was positioned just before the track jump took place. Thus, at time t8, the pickup 2 has been moved to the address in accordance with the address Ad2, in other words, time t2 where the record operation was temporarily stopped.

The system controller 16 controls the memory controller 15 to read that audio data stored in the memory 14 in the period from time t2 to time t3. In addition, the system controller 16 controls the laser control circuit 13 to raise the output level of the laser diode to the record level. The audio data stored in the memory 14b is sent to the encoder 11 through the switch 19. Thus, record data is obtained. The record data is modulated by the modulation circuit 12 to be the modulation signal. The modulation signal is converted into the modulation drive signal by the laser control circuit 13 and then sent to the pickup 2. The control of the servo circuit 3 moves the pickup 2 to the position of address Ad2 corresponding to time t2 where the track jump took place.

The pickup 2 is servo-controlled in such a way that while it is moved from the position of address Ad2 at time t2 to the position of address Ad3 at time t3b as shown by a dot line of line L01 in FIG. 2 so that the continuity of the address data is kept, it irradiates laser light to the disc surface 1a. Thus, data is recorded on the disc surface 1a. This operation is referred to as the retry recording. As shown in FIG. 2, this retry recording is performed in the period from time t8 to time t9 from address Ad2 at time t2 to address Ad3 at time t3b. At time t9, the retry recording is completed.

According to this embodiment, it is assumed that a track jump takes place one time. However, it should be appreciated that the number of times of occurrence of the track jump is not limited to one time. Rather, as long as the memory 14b has enough storage space, the retry recording can be performed regardless of the number of times of occurrence of retry jump.

Next, the substitute process will be described. In the example shown in FIG. 2, line L02 represents the substitute process. The substitute process is performed in such a manner that data which has been recorded is reproduced in the record mode. Thereafter, the quality of the recorded data is verified. When the quality of the recorded data is bad, the recorded data is recorded once again in a predetermined area. As described above, in addition to the optical system for recording data, the pickup 2 is provided with another optical system for reproducing data which has been recorded. The data which has been recorded is always reproduced by the pickup 2 and the demodulation circuit 6 and then sent to the decoder 7.

The decoder 7 detects and corrects an error in accordance with the error correction code of the record data being reproduced. The result of the error detection is sent to the error status detection circuit 9. The error status detection circuit 9 keeps track of the result of the error detection performed by the decoder 7. As the result of the error detection, when the error rate is worse than a predetermined level, a substitute process request signal which is for example in high level is sent to the system controller 16. In the example shown in FIG. 2, the error rate of the data recorded in the period from time t4b to time t5a is worse than the predetermined level.

When the error status detection circuit 9 sends the substitute process request signal in high level to the system controller 16, it restores an address which is earlier than the present address by a predetermined amount of address length. For example, in FIG. 2, the system controller 16 stores address Ad4 at time t4a earlier than the address at time t4b by a predetermined amount of address length. It is assumed that the memory 14b stores at least data equivalent to the predetermined amount of address length. In addition, the system controller 16 controls the memory 14b through the memory controller 15. In other words, the audio data after time t4a is stored in the memory 14b.

In the period from time t5a to time t5b, when the error rate is better than the predetermined level as the result of the error detection performed by the decoder 7, address Ad6 at time t5a is stored. In addition, at time t5b, the substitute process request signal becomes for example low level. The system controller 16 stores address Ad5 at time t5b when the substitute process request signal becomes low level. In addition, at time t5b the system controller 16 controls the memory 14b through the memory controller 15 so that the memory 14b stops recording the audio data. Thus, the memory 14b stores the audio data in the period from time t4a to time t5b.

At time t6, the record operation is completed by the user's key operation or by the program which has been stored. When the system controller 16 detects the completion of recording at for example time t6, it sends a control signal to the laser control circuit 13 and the switch 19. The laser control circuit 13 lowers the output level of the laser diode 22 to the reproduce level in accordance with the control signal received from the system controller 16. In addition, the terminals 19d and 19f of the switch 19 are connected in accordance with the control signal received from the system controller 16.

In the period from time t10 to time t11, the system controller 16 controls the servo circuit 3 to move the pickup 2 to address Ad11 of the substitute area according to address Ad4 of the data area. At time t10, the servo circuit 3 initiates to move the pickup 2 to address Ad11 in the substitute area.

The system controller 16 controls the memory controller 15 to read audio data which has been stored in the period from time t4a to time t5b from the memory 14b so as to rerecord the audio data. In addition, the system controller 16 controls the laser control circuit 13 to raise the output level of the laser diode to the record level.

The audio data stored in the memory 14b is read and then sent to the encoder 11 through the switch 19. Thus, record data is obtained. The record data is modulated into a modulation signal by the modulation circuit 12 in a predetermined modulation method. The modulation signal is converted into a modulation drive signal by the laser control circuit 13 and then sent to the pickup 2. The pickup 2 has been moved to address Ad11 of the substitute area under the control of the servo circuit 3. The pickup 2 is servo-controlled in such a way that while it is moved from address Ad11 to address Ad12 as shown by line L02 in the condition that the continuity of the address data is kept, it irradiates laser light to the disc surface 1a. Thus, data is recorded on the disc surface 1a. This operation is referred to as substitute recording. At time t12, the substitute recording is completed.

After the record data has been recorded at time t12, information necessary for restoration of the record data in the reproduce operation state, for example a substitute address, a substituted address, and so forth, is recorded to addresses Ad21 to Ad22 of the substitute information area shown in FIG. 2 in the period from time t14 to time t15. This recording is referred to as substitute information recording. Since the information such as the substitute address and the substituted address for the substitute information area is recorded in the same way as that in the above mentioned substitute recording, the description thereof will be omitted for simplicity. In addition, as shown in FIG. 2, the substitute recording for the substitute area and the substitute information recording for the substitute information area are performed while data is recorded. Thus, the quality of the recorded data is verified.

Next, the reproduce operation will be described. In the reproduce operation mode, since the reproduce process is performed in accordance with the above mentioned circuit operation of the reproduce operation mode, the circuit operation thereof will be omitted. Only the outline of the operation will be described.

First, information such as substitute addresses Ad11 and Ad12, and substituted addresses Ad4, Ad5, and Ad6 are read from the substitute information area. In accordance with the information such as substitute addresses Ad11 and Ad12, and substituted addresses Ad4, Ad5, and Ad6, data recorded in substitute addresses Ad11 to Ad12 is reproduced. After errors are detected from this data and they are corrected, audio data is restored. Thereafter, this audio data is stored in the memory 14a under the control of the system controller 16 or the memory controller 15. Thereafter, the pickup 2 is moved to the data area under the control of the system controller 16 and the servo circuit 3. In this data area, the normal reproduce operation is performed.

While data is reproduced from the data area, the system controller 16 or the memory controller 15 always keeps track of address data received from the address detection circuit 8. When the address of data being reproduced becomes substituted address Ad4, the connecting state of the switch 18 is controlled by the system controller 16, the terminals 18b and 18e of the switch 18 are connected. In addition, the system controller 16 reads audio data stored in the period of time t11 to time t12 from the memory 14a through the memory controller 15. The audio data being read is substituted into the data stored at substituted address Ad4. The audio data being read is sent to the cross fader 10 and then obtained from the terminal 22. The audio data is continuously read from substituted addresses Ad4 to Ad5 of the memory 14a.

When the system controller 16 receives the address data from the address detection circuit 8 and determines that the pickup 2 has passed through substituted address Ad6, the system controller 16 controls the connecting state of the switch 18 and connects the terminals 18a and 18e thereof. Thus, audio data at substituted address Ad5 or later is output from the decoder 7.

According to this embodiment, it is assumed that the substitute process is executed one time. However, it should be appreciated that the number of execution times of the substitute process is not limited to one time. Rather, as long as the memories 14a and 14b have enough storage space, the number of execution times of the substitute process is not restricted.

Figure 3:
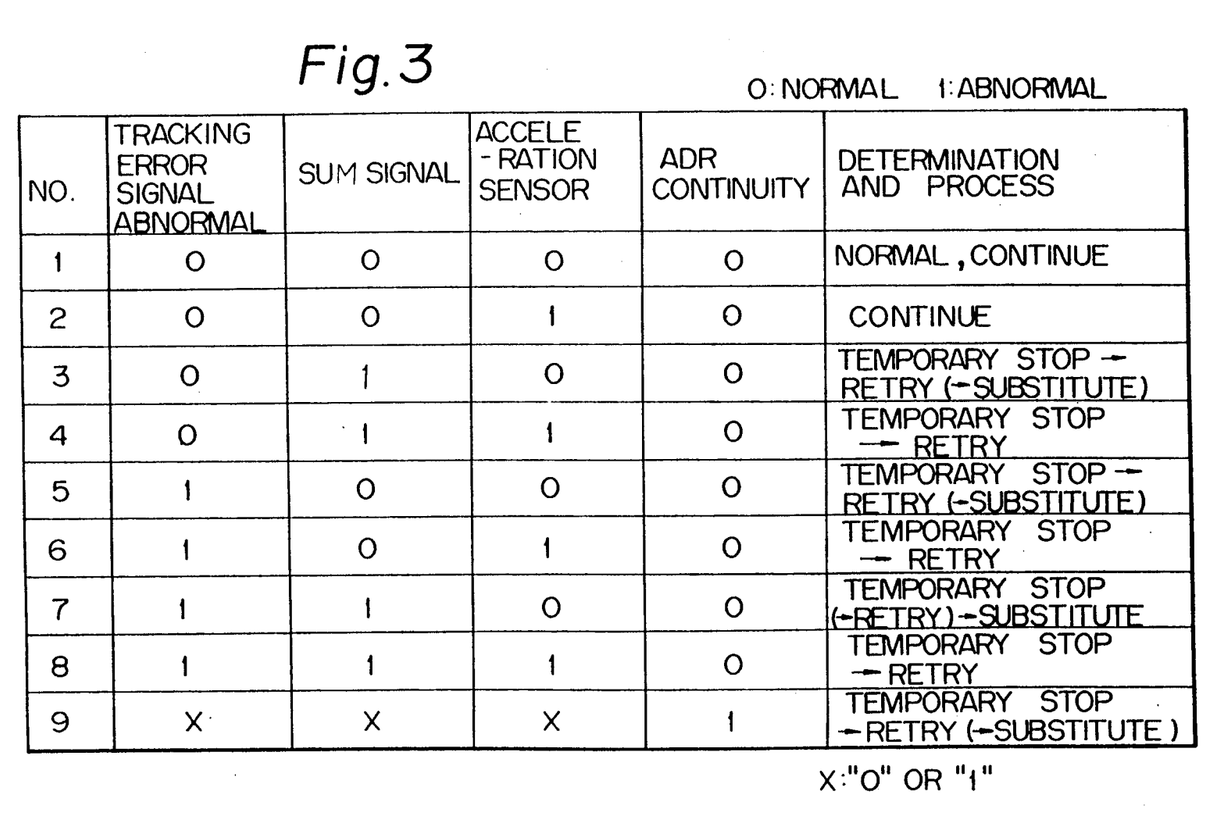
FIG. 3 is a table describing various signals for use with each case, presence/absence of abnormality of data, and contents of processes.

FIGS. 5 to 8 are flow charts for determining whether a track jump took place in accordance with states of various detection signals. In these flow charts, the states of various detection signals are categorized as cases. Next, with reference to FIG. 3, each of these cases will be described. In FIG. 3, as signals for determining whether a track jump took place, there are the tracking error signal STR, the sum signal, which is the level of light reflected from the disc surface 1a, the shock detection signal, the signal with respect to the continuity of address data, and so forth. Next, these signal, data, and normality/abnormality thereof will be described.

[1] Tracking error abnormal

When the level of the tracking error signal STR exceeds a normal level thereof and a predetermined level of traverse peak, it is determined that the probability of occurrence of track jump is large.

[2] Track jump signal

Figure 4:
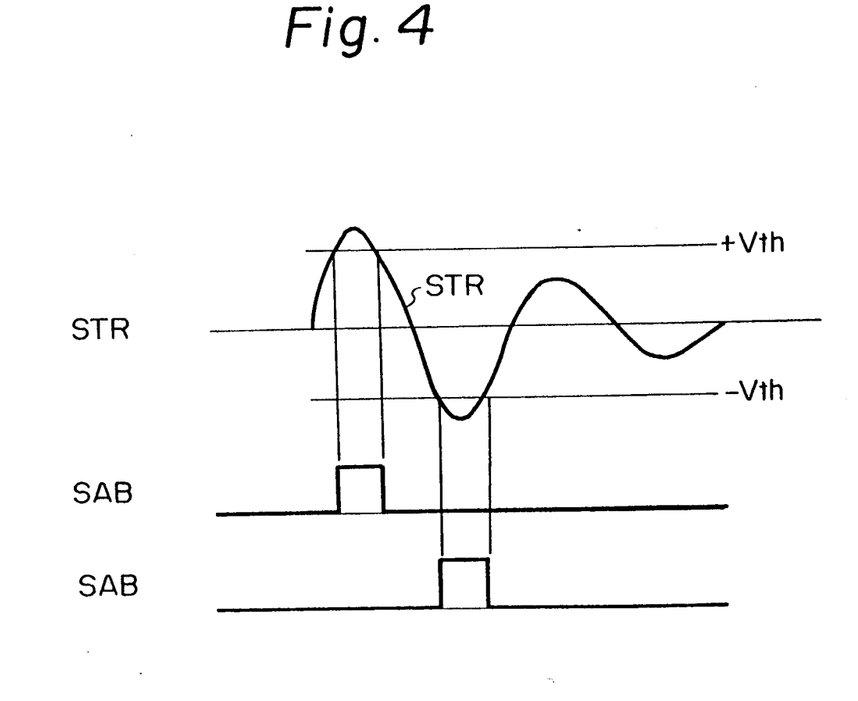
FIG. 4 is a chart describing a tracking error signal.
Figure 5:
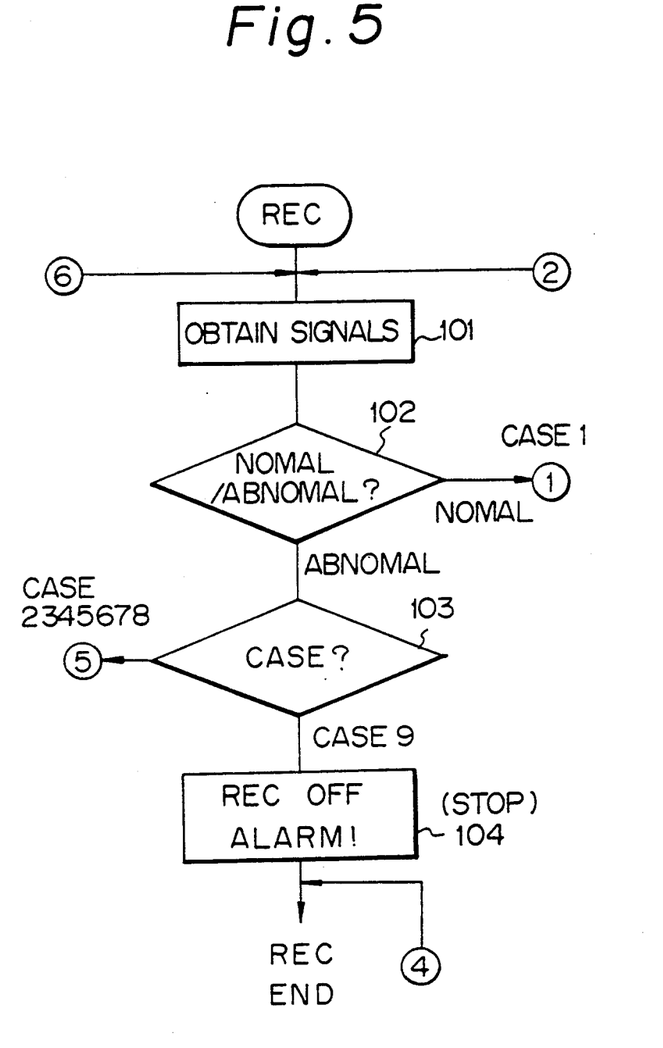
FIG. 5 is a flow chart showing a process of the embodiment in accordance with the present invention.
Figure 6:
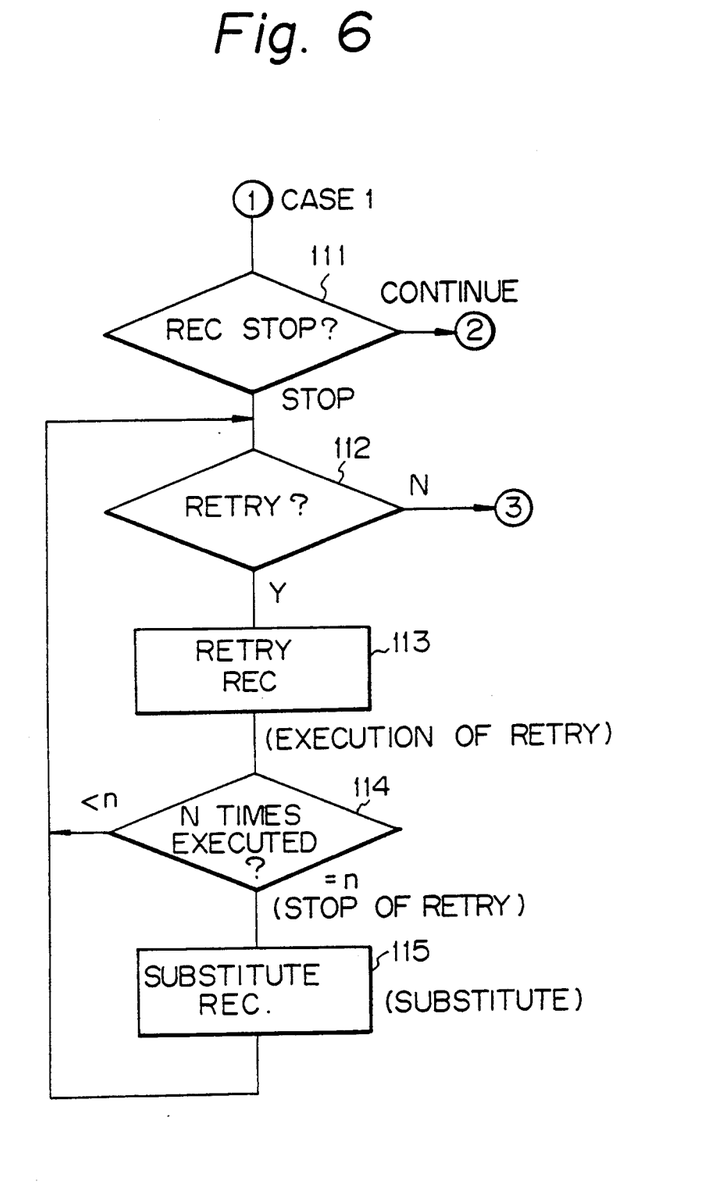
FIG. 6 is a flow chart showing a process of the embodiment in accordance with the present invention.
Figure 7:
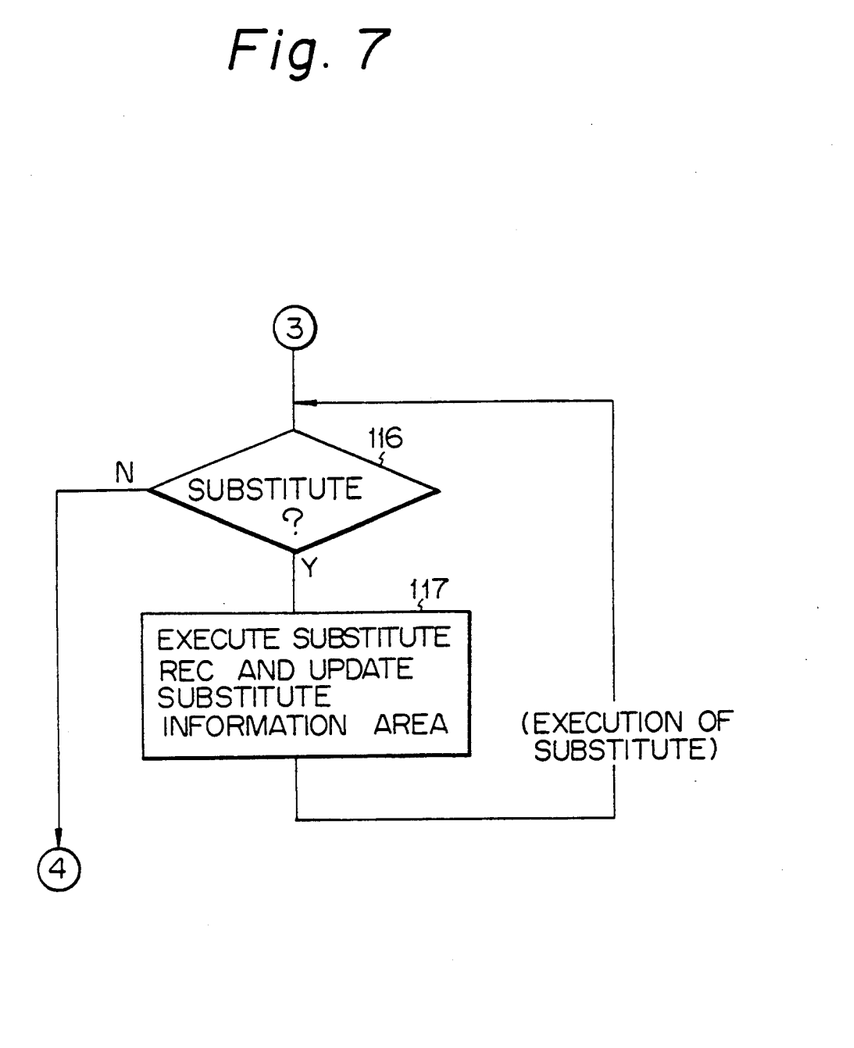
FIG. 7 is a flow chart showing a process of the embodiment in accordance with the present invention.
Figure 8:
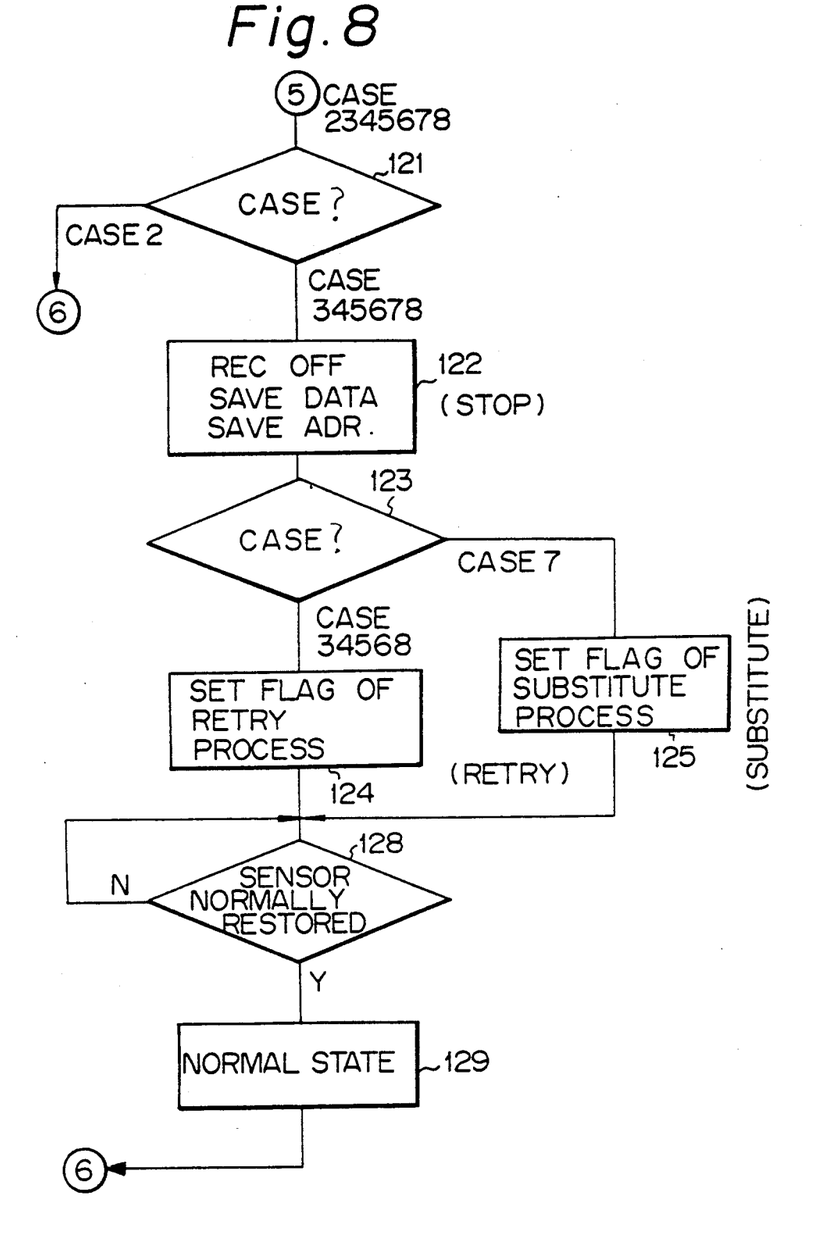
FIG. 8 is a flow chart showing a process of the embodiment in accordance with the present invention.

When a track jump takes place, as shown in FIG. 4, the peak level of the tracking error signal STR exceeds predetermined threshold levels +Vth and −Vth.

When the peak level of the tracking error signal STR exceeds the predetermined threshold values +Vth and −Vth, it is determined that the tracking error signal STR becomes abnormal. In this case, as shown in FIG. 3, for example, the tracking abnormal signal SAB which is for example in high level is formed. This tracking abnormal signal SAB is used to form the track jump detection signal and the shock abatement signal.

[3] Sum signal

By measuring the decrease of the reflectance of light, a defect of the disc surface 1a is detected.

[4] Shock detection signal generated by shock sensor 5

Vibration and shock applied, which are causes of a track jump, from the outside of the apparatus are detected by using an acceleration sensor. In particular, the acceleration in the tracking direction is detected.

[5] Continuity of address data

By regularly measuring the continuity of absolute address data, a track jump can be securely detected.

Then, with reference to flow charts of FIGS. 5 to 8, the substitute process and the retry process according to the embodiment will be described in detail. In step 101, the tracking error signal STR, sum signal, address data, and so forth are obtained as well as the shock detection signal from the shock sensor 5. Thereafter, the flow advances to step 102.

In step 102, it is determined whether the shock detection signal, tracking error signal STR, sum signal, the continuity of address data, and so forth are normal. When any one of these signals and so forth is abnormal, it is determined that cases 2 to 9 took place and the flow advances to step 103. When all of these signals are normal, the flow advances to step 111.

In step 103, it is determined whether the case 9 took place. When the determined result was the case 9, the flow advances to step 104. When the determined result was not the case 9, the flow advances to step 121. The case 9 represents that the continuity of the address data was abnormal.

Then, the process which is performed in the case 9 will be described. When the abnormality with respect to the continuity of address data was detected, it can be anticipated that data being recorded has been fatally destroyed. However, the data may be restored in some instances, data with an address where the incontinuity took place is stored in the memory 14b. Thereafter, data is accessed at an address where data continuity is present and then the record operation is resumed.

Upon completion of the record operation, audio data which is stored in the memory 14b is recorded as record data from an address where the data incontinuity took place. Like the retry process, when data incontinuity took place as a result of the record process, the substitute process is executed. When data incontinuity took place, an alarm is issued to the user in step 104 and the record operation is stopped [REC END].

In step 121, it is determined whether the case 2 took place. When the determined result was the case 2, the flow returns back to step 101. When the determined result was not the case 2, namely, one of cases 3 to 8 took place, the flow advances to step 122.

The case 2 represents that only the shock detection signal from the shock sensor 5 was abnormal. Then, the operation which is performed in the case 2 will be described. Although shock or vibration was applied from the outside of the apparatus, since the tracking error signal STR was normal, it is determined that no tack jump took place. Thus, in the case 2, the flow returns back to step 102 and the record operation is resumed.

The cases 3 to 8 represent that at least one of the tracking error signal STR, the sum signal, and the shock detection signal from the shock sensor 5 was abnormal. However, these cases exclude a situation where only the shock sensor 5 detects an abnormality. In the cases 3 to 8, since an abnormality is detected in combination of each signal, these cases will be individually described in the following.

The case 3 represents that only the sum signal was abnormal. In other words, only a defect of the disc surface 1a was detected. In this case, since there is a probability where an abnormality of the tracking error signal STR is not detected, the record operation is stopped as a temporary measure in step 122. The continuity of address data is checked. When it was normal, the flag of the retry process is set in step 124. When the address data was abnormal, the flag of the substitute process is set. Thereafter, the flow advances to step 128.

The case 4 represents that although the shock sensor 5 detected an abnormality, the tracking error signal STR was normal. Since there is a probability where the tracking error signal STR became abnormal due to a defect of the disc surface 1a, the record operation is stopped as a temporarily measure in step 122. It is supposed that the major cause of this abnormality is due to a disturbance. Thus, in step 124, the flag of the retry process is set. Thereafter, the flow advances to step 128.

The case 5 represents that only the tracking error signal STR was abnormal. Although the case of this abnormality cannot be defined, since a tracking error took place, the record operation is stopped as a temporary measure in step 122. In step 124, the flag of the retry process is set. Thereafter, the flow advances to step 128.

The case 6 represents both the tracking error signal STR and the shock detections signal from the shock sensor 5 were abnormal due to vibration or shock applied from the outside of the apparatus. Since there is a high probability where a track jump will take place (or it took place), the record operation is stopped as a temporarily measure in step 122. Since it is supposed that the major cause of this case is disturbance, the flag of the retry process is set in step 124. Thereafter, the flow advances to step 128.

The case 7 represents that both the tracking error signal STR and the sum signal were abnormal and a defect of the disc surface 1a was detected. Since it is supposed that there is a high probability where a track jump will take place (or it took place) due to a defect of the disc surface 1a, data cannot be recorded in this data area. Thus, the flag of the substitute process is set. Thereafter, the flow advances to step 128.

The case 8 represents that all the tracking error signal STR, the sum signal, and the shock detection signal from the shock sensor 5 were abnormal due to vibration or shock applied from the outside of the apparatus. Thus, the record operation is stopped as a temporary measure in step 122.

The flag of the retry process is set in step 124. Thereafter, the flow advances to step 128. In step 128, it is determined whether the shock sensor 5 was restored to the normal state. When the shock sensor 5 has not been restored to the normal state, the flow returns back to step 128. When the shock sensor 5 has been restored to the normal state, the flow advances to step 129.

In step 129, the tracking error signal STR, the sum signal, the shock detection signal from the shock sensor 5, the address data, and so forth are reset to their initial states. Thereafter, the flow returns back to step 101.

When it was determined that the case 1 took place in step 102, all the shock detection signal, the tracking error signal STR, the sum signal, and the continuity of the address data were normal. In this case, when the flag of the retry process or the flag of the substitute process has been set, the process corresponding to the flag which has been set is performed. Then, the process which is performed in the case 1 will be described.

In step 111, it is determined whether the user commanded to complete the record operation or the record operation was completed by the program stored in memory. When it was determined that the record operation was not completed, since the record operation should be continued, the flow returns back to step 101. When it was determined that the record operation was completed, the flag is referenced and the flow advances to step 112 for performing the retry process or the substitute process.

In step 112, it is determined whether the flag of the retry process was set. When it was determined that the flag of the retry process was set, the flow advances to step 113. When it was not, the flow advances to step 116.

In step 113, the retry process is executed. Thereafter, the flow advances to step 114. In step 114, it is determined whether the retry process was repeatedly executed N times. When the retry process was not executed N times, the flow returns back to step 112.

When a rewritable optical disc or a photomagnetic disc is used, it is determined whether the same result was obtained by the retry process executed N times. When the same result was obtained with the retry process executed N times, since there is a defect of the disc surface 1a of the optical disc 1, the substitute process is performed in step 115. Thereafter, the flow advances to step 112 and then step 116. When an optical disc which is not rewritable is used, it is determined whether the substitute process should be executed in accordance with the result of the retry process. When it was determined that the substitute process was required, the substitute process is performed in step 115. Thereafter, the flow advances to step 112 and then step 116.

In step 116, it is determined whether the flag of the substitute process was set. When it was determined that the flag was set, the flow advances to step 117. When it was not, the record operation is completed [REC END].

In step 117, the substitute process is executed. In other words, the substitute recording is performed and the substitute information area is updated. Thereafter, the flow returns back to step 116 and then the record operation is completed.

When the substitute process or the retry process shown in FIG. 2 is performed, in executing the first process flow of steps 121 to 129, the flag of the retry process is set, and in executing the second process flow of steps 121 to 129, the flag of the substitute process is set. When the completion of the record operation is commanded in executing the third process flow, the flow advances to steps 111 to 117. In this situation, since the flag of the retry process and and the flag of the substitute process were set, the retry process and the substitute process are executed in steps 111 to 117.

In this embodiment, the memories 14a and 14b were separately described. However, it is possible to use a single memory instead of the memories 14a and 14b. When data where the substitute process has been performed is updated in the the single memory and thus address data of the memory should be rewritten and the new substitute process is required, the reproduce operation to be performed until the optical disc 1 is unloaded and the power is turned on or turned off can be simplified.

In this embodiment, the record system for modulating the output of the laser diode with record data was described. However, the present invention is not limited to this system. Rather, the present invention can be applied to for example a recording apparatus using a photomagnetic disc for modulating the magnetic field with record data.

According to this embodiment, even if a track jump takes place due to shock, vibration, or the like from the outside of the apparatus, since the track jump detection circuit 4 and/or the system controller 16 detects the track jump and controls the output level of laser light through the laser control circuit 13, the output level of the laser diode of the pickup 2 is decreased to the reproduce level. Thus, this construction can prevent data from being mistakenly recorded in data area where another data has been recorded and data which has been recorded from being destroyed.

In addition, while the record operation of audio data is temporarily stopped due to occurrence of a track jump (in the period from time t2 to time t3a), the audio data is stored in the memory 14b under the control of the system controller 16 and/or the memory controller 15. Thus, although audio data is continuously received, this construction can prevent the audio data from being lost.

In addition, after vibration, shock, or the like abates down, the pickup 2 is servo-controlled under the control of the system controller 16 and/or the servo circuit 3 in such a way that the continuity of the address data is kept. Thus, data is recorded by the retry process in the manner that the continuity of address data is kept from address Ad2 a time t2 to address Ad3 at time t3b. Therefore, the data can be easily reproduced.

Moreover, according to this embodiment, while data such as audio data which is continuously received is recorded, the error status detection circuit 9 keeps track of the quality of record state of the data. When the circuit 9 determined that the quality of the recorded data was bad, the substitute process request signal is output and audio data both in the period from time t4b to time t5a where the circuit 9 determined so and in the adjacent period from time t4a to time t5b is stored in the memory 14b under the control of the system controller 16 and the memory controller 15. Thereafter, the substitute process is performed. Thus, although audio data is continuously received, its loss can be prevented. In addition, the reliability and quality of the data being recorded are improved.

Furthermore, since information with respect to the substituted address, the substitute address, and so forth are recorded in the substitute information area, the record data can be easily reproduced. Moreover, the substitute process does not require a system with a high access speed.

What is claimed is:

1. An apparatus for recording a signal on a disc medium comprising:
    laser beam generating means including a moveable pickup head for generating a laser beam for recording a signal on a disc medium;
    servo means for controlling tracking of said pickup head;
    track jump detecting means for detecting a track jump of said pickup head, said track jump exhibiting a duration;
    memory means for storing said signal during an occurrence of said track jump;
    first control means responsive to said track jump detecting means, for controlling said laser beam generating means so that a recording operation by said laser beam is temporarily stopped during the occurrence of said track jump;
    second control means responsive to said track jump detecting means, for controlling said servo means and said laser beam generating means so that the recording operation by said laser beam is resumed from a first track address which is equal to the sum of the duration of the track jump and a second track address at which the track jump has begun; and
    third control means for controlling said memory means, said laser beam generating means and said servo means so that said signal stored in said memory means is recorded on an area between said first and second addresses after the completion of the resumed recording operation.

2. The apparatus according to claim 1, wherein said track jump detecting means includes a shock sensing device for sensing a shock, and a track jump detect circuit for detecting track jump in response to an output signal from said shock sensing device and a tracking error signal from said servo means.

3. The apparatus according to claim 2, further comprising address memory means for storing address data reproduced from said disc medium during the occurrence of said track jump.

4. The apparatus according to claim 1, further comprising second memory means for storing a reproduced signal from said disc medium, and an error detecting circuit for detecting an error condition of said reproduced signal.

5. The apparatus according to claim 4, further comprising second address memory means for storing second address data when said error condition exceeds a predetermined value.

6. The apparatus according to claim 5, further comprising fourth control means for controlling said second memory means, said laser beam generating means and said servo means so that said reproduced signal stored in said second memory means is read out and re-recorded on a designated area of said disc medium.

* * * * *